No. 796,087. PATENTED AUG. 1, 1905.
H. REISERT.
PROCESS OF PURIFYING WATER.
APPLICATION FILED DEC. 8, 1903.
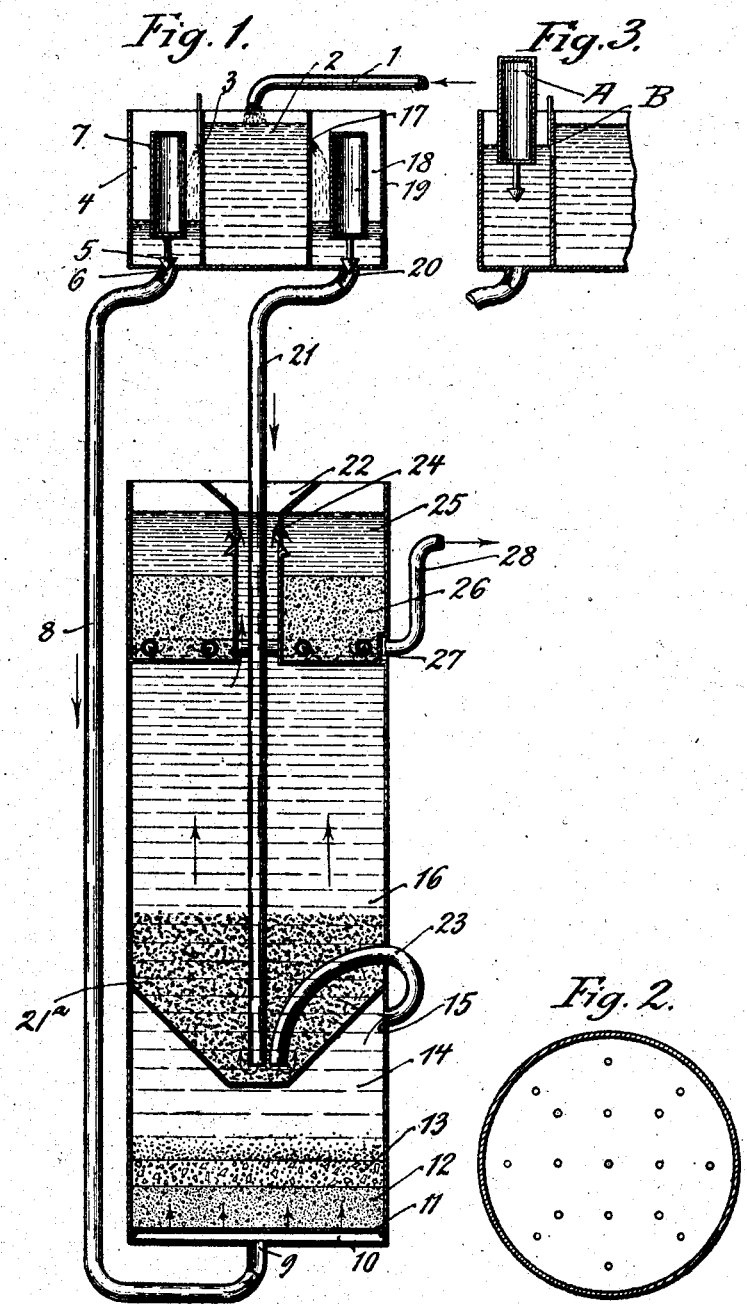
Witnesses
F. N. Rochrich
John O. Gumpley
Inventor
Hans Reisert
By his Attorney
William F. Bissing

UNITED STATES PATENT OFFICE.

HANS REISERT, OF COLOGNE, GERMANY, ASSIGNOR TO HANS REISERT COMPANY, A CORPORATION OF GERMANY.

PROCESS OF PURIFYING WATER.

No. 796,087.      Specification of Letters Patent.      Patented Aug. 1, 1905.

Application filed December 8, 1903. Serial No. 184,278.

*To all whom it may concern:*

Be it known that I, HANS REISERT, a subject of the German Emperor, and a resident of Cologne, Germany, have invented certain new and useful Improvements in Processes of Purifying Water, of which the following is a specification.

My invention relates to a process of purifying water, and more particularly to a process in which the water is first treated with a means for freeing it from carbonic acid and carbonates, the treating solution that I prefer to use being a solution of lime. The water is preferably treated in addition with a means for neutralizing and removing the sulfates and free sulfuric acid that it may contain, this means preferably consisting of barium carbonate or an equivalent reagent.

The object of my invention is to avoid the use of mechanical stirrers or of pumping apparatus with all their disadvantages, and particularly to utilize the energy of the flowing water directly and with the greatest efficiency to perform the operations of preparing, stirring, or mixing the reagents, as well as mingling them with the water to be purified.

The nature of my invention is to intermittently discharge the water to be purified into a vessel that contains a suitable reagent, which is preferably barium carbonate or the like, the water being discharged at a high velocity and having considerable momentum, so as to enable it to thoroughly mingle with the reagent. I also intermittently feed the water that is used to produce the solution of lime and cause it to act upon the lime in such a manner as to stir and agitate the entire body thereof, this being preferably accomplished by breaking up the initial stream or column of water into a great number of smaller currents and letting them act impulsively and at intervals upon the lime. The nature of this action is preferably such as to expose as much of the solvent as possible to the action of the lime and to increase the surface of the solvent reacted upon. I also transmit the impulses and momentum of the water used to dissolve the lime to the decanting apparatus. Into this decanter there is introduced the water to be purified and preferably another reagent to precipitate the sulfates, and I utilize these impulses to assist in stirring and mixing the reagents and the water to be purified.

My invention also contemplates the proper settling and filtering of the raw water.

With the above-named and other objects in view my invention consists in the processes and in the steps of the processes that are hereinafter described in the specification and pointed out in the claims.

Referring now to the accompanying drawings, which illustrate one mode of carrying my invention into effect, Figure 1 is a more or less diagrammatic representation of one form of apparatus that may be used in carrying out the various steps of my process. Fig. 2 illustrates a form of distributing device that may be used in the step of breaking up the solvent. Fig. 3 illustrates the action of a float and valve.

I will first describe my method of producing a solution of the reagent that is used to free the raw water from carbonates and the like. This reagent is preferably lime, which I proceed to dissolve as follows: The supply-pipe 1 discharges the raw water in a continuous stream into the supply-tank 2. The water from this supply-tank divides into two independent streams conducted through two independent channels. One part of the raw water is discharged through an adjustable opening 3 into the measuring vessel 4. The opening 3 is adjusted in size according to the composition of the water to be purified. The size of the opening 3 regulates the amount of lime-water per unit of raw water that must be used to free the latter from its carbonates and the like. Any form of intermittently-acting measuring device may be used in carrying out this step of my process. I may, for example, use a siphon; but I have illustrated a form of float-operated valve the particular construction of which may be widely varied. The valve may be connected to the float in any desired manner—as, for example, by a system of levers—and in the present instance it is connected to the float 7 by a thin stem. In the apparatus shown the valve 5 is pressed down upon its valve-seat 6 by the weight of the column of water above it, to which is added the weight of the valve and float 7, as well as the pressure due to the partial vacuum beneath the valve caused by the descent of the water in the pipe 8. As the level of the water in the measuring vessel 4 rises the buoyant effect of the water, which is of course equal to the effective weight of the water displaced, increases until the buoyant upward pressure is sufficient to raise the valve off its seat. This occurs suddenly at a predetermined level and the valve is suddenly raised. As soon as the valve 5 leaves its seat 6 the water-pressure can act beneath the valve and the water-pressure on the valve is balanced. The valve and the float quickly assume a higher level with respect to the surrounding liquid and in the present embodiment of the invention project to a greater degree from the surface thereof. The new position of the float and valve is shown diagrammatically in Fig. 3. In this figure the level of liquid necessary to start the valve from its seat is designated by the letter A on the float, and the new position that the float assumes when the valve has left its seat is lettered B. By using a slender hollow cylinder for the float the amount of this change in level of the float is proportionally increased. By the operation of the measuring vessel 4 a quantity of water is suddenly and impulsively projected down the pipe 8. In order to avoid boring holes in the body of the lime to be saturated, and thus failing to produce a saturated solution, since the surface of the solvent is not sufficiently exposed to the lime and since too much water will pass through the hole or channel formed by a solid jet for it to be saturated by the lime that forms the wall of said channel, it is necessary to break up this rapidly-flowing solid stream of water with its hydraulic-ram action into a plurality of small streams, that are preferably uniformly distributed throughout the body of the reagent. Any suitable means may be used to carry out this step of my process. I have indicated upon the drawings a form of distributer that I have found effective. The water enters, preferably, at the bottom of the distributing device at the point 9, at which point the water expands in the chamber 10. Above the chamber 10 is placed a distributing-plate 11, that is more fully illustrated in Fig. 2. The sum of the areas of the perforations in the distributing-plate is preferably equal to the internal area of the pipe 8 in order to secure substantial uniformity of distribution. Above the distributing-plate I place a layer 12 of any suitable material, such as gravel, which serves to still further break up and distribute the inflowing stream of water. Above the layer of gravel is placed the lime that is to be used to form a saturated solution. The saturating-reservoir 14, with an outlet 15, rises above the distributing-body.

The operation of the part of my process that I have already described is as follows: The water being discharged from the vessel 4 at suitable intervals, which preferably occupies a few seconds, falls with an impulsive rush down the pipe 8 and enters the distributing-chamber. The water or solvent is broken up into a number of fine streams by means of the distributing device, which step in the process not only serves to thoroughly agitate the entire body of lime, but also brings minute streams of water into contact with the lime, so that all parts of the water or solvent thoroughly commingle with the material to be dissolved and are exposed to the action thereof. After each impulsive discharge, which lasts for a short interval, the water to be saturated rests in contact with the lime for an interval which is preferably longer than the first interval—for example, for a few minutes. This allows the saturated solution to clarify and the saturated lime-water to accumulate at the top of the lime-saturater 14. From this lime-saturater the impulse of the descending water column 8, as well as some of the lime solution, is transmitted to a vessel 16, which in the present instance serves as a decanter. The momentum of the downflowing column of water must be sufficient to overcome the inertia of the liquid in the reservoir, which by reason of the lime in solution mud, and the like is of considerably greater specific gravity.

I will now describe another step in my process, which relates to the introduction of the water to be purified into the vessel that contains the reagent for freeing it from impurities, which vessel is preferably a decanter. The raw water coming from the tank 2 enters by graduated opening 17 the water-supply vessel 18, which is preferably intermittently operated. The vessel 18 is provided with a float 19 and valve 20, whose operation is similar to that of the float and valve previously described. At each intermittent operation of the valve 20 the raw water is discharged into the pipe 21. This pipe is of a considerable height, so that the water after leaving it has acquired a high velocity and great momentum. The bottom of the pipe 21 discharges at the bottom of the vessel 16. At the point of entry of the pipe 21 into the vessel 16 a supply of a suitable reagent, such as barium carbonate $21^a$, is introduced by means of the funnel 22, so as to lie at the bottom of the vessel 16, surrounding the pipe 21. The discharge-pipe 23, which communicates with the lime-saturater, also preferably discharges near the point of discharge of the pipe 21. By this step of my process I am enabled to intermittently discharge the water to be purified at a high velocity and with sufficient momentum into the vessel that has been previously supplied with a reagent, so as to thoroughly agitate the latter. By this step of the process the water to be purified is freed from free sulfuric acid, sulfates, and the like. Barium carbonate is very slightly soluble in pure water; but when the water contains sulfuric acid the barium carbonate reacts with the sulfuric-acid compounds and frees the water therefrom.

The vessel 16 is preferably a decanter, at the top of which the water collects after it has been treated, the impurities being thus given an opportunity to settle to the bottom. I have shown the water as discharging through openings 24 into an upper chamber 25, at the bottom of which chamber I have preferred to locate a filter 26, so as to filter the treated water. At the bottom of the filter I place a coil 27, which ends in the discharge-pipe 28, from which the purified water is drawn.

It will be understood by those skilled in the art that the order of the steps of my process may be varied and that some of the steps may be used without the use of the other steps that I have described. I may also use equivalent processes and equivalent steps to those that I have described.

Having thus fully described my invention, what I claim, and desire to secure by Letters Patent, is—

1. The process of producing solutions which consists in intermittently supplying the solvent to the reagent to be dissolved in such a manner as to stir substantially all of the reagent, substantially as described.

2. The process of producing solutions which consists in intermittently supplying the solvent to the reagent to be dissolved at suitable intervals and in such a manner as to stir and agitate substantially all of the reagent, and then permitting the solvent to remain in contact with the reagent after the intermittent supplies, substantially as described.

3. The process of producing solutions which consists in intermittently supplying the solvent to the reagent during short intervals in such a manner as to stir and agitate substantially all of the reagent and then permitting the solvent to remain in contact with the reagent during longer intervals, substantially as described.

4. The process of producing solutions of a reagent which consists in intermittently and impulsively supplying the solvent and breaking up the supply of solvent before it reaches the reagent in such a manner as to distribute it throughout the body of the reagent, substantially as described.

5. The process of saturating water with lime which consists in intermittently and impulsively supplying the water to be saturated to the lime in such a manner as to stir substantially the entire body of the lime and expose all the parts of the solvent to the action thereof, substantially as described.

6. The process of producing solutions of lime which consists in intermittently and impulsively supplying water and breaking up the supply of water before it reaches the lime in such a manner as to distribute it throughout the body of the lime, substantially as described.

7. An improvement in the art of purifying water which consists in intermittently and impulsively feeding water to a reagent to dissolve it and transmitting the impulse that has been given the solution thus formed to the water to be purified, substantially as described.

8. An improvement in the art of purifying water which consists in intermittently and impulsively feeding water to a reagent to dissolve it and transmitting the impulse that has been given the solution thus formed together with some of the dissolved reagent to the water to be purified, substantially as described.

9. An improvement in the art of purifying water which consists in intermittently and impulsively feeding water to a reagent so as to dissolve it, intermittently supplying the water to be purified to a suitable receptacle and transmitting the impulse that has been given the solution together with some of the dissolved reagent to the water in the receptacle, substantially as described.

10. An improvement in the art of purifying water which consists in intermittently feeding water to a suitable reagent to dissolve it, feeding the water to be purified intermittently to a decanter, introducing through an independent channel at intervals and impulsively the dissolved reagent into the decanter containing the water to be purified, and withdrawing the purified water from the top of the decanter, substantially as described.

11. An improvement in the art of purifying water which consists in intermittently feeding water to a suitable reagent to dissolve it, feeding the water to be purified intermittently to a decanter, introducing through an independent channel at intervals and impulsively the dissolved reagent into the decanter containing the water to be purified, filtering the resulting product, and withdrawing the purified and filtered water from the top of the decanter, substantially as described.

12. An improvement in the art of purifying water, which consists in intermittently discharging the raw water to be purified at a high velocity and with considerable momentum into a vessel containing a suitable reagent that has been previously supplied thereto, so as to agitate the latter, substantially as described.

13. An improvement in the art of purifying water which consists in projecting a supply of lime-water into a suitable receptacle containing a carbonate, and discharging into said receptacle at a high velocity the raw water to be purified, substantially as described.

14. An improvement in the art of purifying water, which consists in intermittently projecting a supply of lime-water into a suitable receptacle containing a carbonate, and intermittently discharging at a high velocity into said receptacle the raw water to be purified, substantially as described.

15. An improvement in the art of purifying water which consists in intermittently projecting a supply of lime-water into a suitable receptacle containing a carbonate, and intermittently letting fall the water to be purified into said receptacle from a height sufficient to give the water great momentum, substantially as described.

16. An improvement in the art of purifying water, which consists in intermittently projecting a supply of lime-water into a suitable receptacle, containing barium carbonate, intermittently discharging at a high velocity into said receptacle the raw water to be purified, and removing from the top of the receptacle the treated water, substantially as described.

17. An improvement in the art of purifying water which consists in intermittently feeding water to lime to produce lime-water, intermittently feeding the raw water to be purified to one part of a suitable decanter containing a carbonate, transmitting the impulse of the feed-water for the lime solution and some of the clear lime-water to the water to be purified, and drawing off the treated water at another part of the decanter, substantially as described.

18. An improvement in the art of purifying water which consists in intermittently feeding water to lime to produce lime-water, intermittently feeding the raw water to be purified to one part of a suitable decanter containing a carbonate, transmitting the impulse of the feed-water for the lime solution and some of the clear lime-water to the water to be purified, filtering the product, and drawing off the treated water at another part of the decanter, substantially as described.

19. An improvement in the art of purifying water which consists in impulsively projecting a supply of lime-water into a suitable receptacle containing a solid carbonate and discharging into said receptacle at a high velocity the raw water to be purified.

20. An improvement in the art of purifying water which consists in intermittently and impulsively projecting a supply of lime-water into a suitable receptacle containing a solid carbonate and intermittently discharging at a high velocity into said receptacle the raw water to be purified.

21. An improvement in the art of purifying water which consists in intermittently and impulsively projecting a supply of lime-water into a suitable receptacle containing a solid carbonate and intermittently letting fall the water to be purified into said receptacle from a height sufficient to give the water great momentum, substantially as described.

22. An improvement in the art of purifying water which consists in intermittently projecting a supply of lime-water into a suitable decanter containing solid barium carbonate, intermittently discharging at a high velocity into said decanter the raw water to be purified and removing the treated water from the top of the decanter, substantially as described.

23. In a water-purifying process, the process of producing a solution which consists in intermittently supplying the solvent to the reagent and imparting to the solvent sufficient momentum to stir the reagent, substantially as described.

24. In a water-purifying process, the process of producing a saturated solution of lime-water which consists in intermittently supplying the water to the lime and imparting to the water sufficient momentum to stir the lime.

25. In a process for purifying water, the process of producing lime-water which consists in intermittently supplying the water to the lime, imparting to the water sufficient momentum to stir the lime, and distributing the water before it reaches the lime, substantially as described.

26. In a water-purifying process the step in the process of precipitating sulfuric acid or its compounds from the water to be purified by means of a suitable reagent in comminuted form which consists in impulsively supplying water to the reagent in such a manner as to stir substantially the entire mass of the reagent.

27. In a water-purifying process wherein baryta is utilized, the step which consists in impulsively supplying water to the baryta in such a manner as to thoroughly stir the baryta.

In testimony whereof I have signed my name to this specification in the presence of two subscribing witnesses.

HANS REISERT.

Witnesses:
GUSTAV ELSNER,
WILHELM KÜPPERS.